United States Patent [19]
Hanson

[11] Patent Number: 5,269,187
[45] Date of Patent: Dec. 14, 1993

[54] AUTOMOTIVE ACCELEROMETER

[76] Inventor: Robert K. Hanson, P.O. Box 508, Beatty, Nev. 89003

[21] Appl. No.: 715,545

[22] Filed: Jun. 14, 1991

[51] Int. Cl.$^5$ ............................................. G01P 1/08
[52] U.S. Cl. ...................................... 73/495; 73/492; 73/499; 340/439; 340/461
[58] Field of Search ................. 73/511, 517 R, 495, 73/489, 492, 493; 340/439, 441, 461, 753, 754, 669

[56] References Cited

U.S. PATENT DOCUMENTS

| | | | |
|---|---|---|---|
| 2,963,911 | 12/1960 | Courtney-Pratt et al. | 73/517 R |
| 3,318,157 | 5/1967 | Browning et al. | 73/492 |
| 4,051,734 | 10/1977 | Skinner | 73/514 |
| 4,243,938 | 1/1981 | Bliven, II et al. | 324/169 |
| 4,341,996 | 7/1982 | Coffman | 324/162 |
| 4,430,895 | 2/1984 | Colton | 73/497 |
| 4,470,011 | 9/1984 | Masuda | 324/166 |
| 4,622,548 | 11/1986 | Andres et al. | 340/753 |
| 4,627,011 | 12/1986 | Spencer et al. | 73/517 B |
| 4,807,475 | 2/1989 | Graham | 73/492 |

OTHER PUBLICATIONS

Sportscar Magazine, Article "G-Analyst Delivers", Feb. 1988 pp. 66-70, by Don Fuller.

*Primary Examiner*—John E. Chapman
*Attorney, Agent, or Firm*—John Edward Roethel

[57] ABSTRACT

An automotive straight line G-meter utilizes the input from a piezoresistive accelerometer to accurately measure and display both straight line forward and backward as well as lateral or side to side acceleration and deceleration of a vehicle. The automotive straight line G-meter includes solid state circuitry which temperature compensates and amplifies the transducer output before coupling to an analog meter that is calibrated to show the gravity effect of acceleration and deceleration of the vehicle. The G-meter device further includes circuitry for energizing an automotive tachometer that employs a LED (light emitting mode) bar graph to display the revolutions per minute (RPM) of the vehicle engine.

12 Claims, 3 Drawing Sheets

AUTOMOTIVE ACCELEROMETER

Metering device for measuring and displaying in earth gravity units, otherwise known as "G's", straight line as well as lateral acceleration and deceleration of a moving vehicle.

BACKGROUND OF THE INVENTION

The concept of G-force measurement and instrumentation itself is not new. For years there have been instruments utilized in aircraft and spacecraft to measure and display the G-forces applied in both vertical and lateral movements. The application of this technology to the automotive industry has to some extent been limited. For several years, there have been devices on the market employing G-force measurement as a means to accomplish various automotive related functions such as shock and vibration testing, skid pad testing, crash testing, anti-theft alarms as well as other functions.

Although integrated circuit accelerometers have been utilized in some automotive applications, a tremendous untapped potential exists for the implementation of such devices into the field of automotive instrumentation. Current automotive technology provides a variety of instruments which help a driver monitor the performance and condition of the vehicle. Automotive speedometers and tachometers are two such devices which have been in use for decades. The information provided by these devices is extremely limited. A speedometer merely provides the speed of the vehicle; a tachometer merely provides the revolutions per minute (RPM) of the vehicles power plant. Neither of these devices provide the driver of a vehicle an accurate, instantaneous readout of the vehicle's ability to accelerate or decelerate; nor do they provide a means of accurately analyzing changes made to a vehicle which may affect the acceleration or deceleration performance of the vehicle. The acceleration or deceleration performance of a vehicle is best measured by an accelerometer or G-force measuring device.

G-force measuring devices, of the type disclosed in U.S. Pat. No. 3,318,157 entitled "Acceleration-Deceleration Indicator" issued May 9, 1967 to I. Browning et al; U.S. Pat. No. 4,051,734 entitled "G-METER issued Oct. 4, 1977 to Skinner and U.S. Pat. No. 4,807,475, entitled "Accelerometer" issued Feb. 28, 1988 to W. B. Graham are representative of accelerometers having pendulum-type acceleration sensitive elements.

The pendulum-type accelerometers are inherently inaccurate since the mass of the gears, shafts, pointers and any other moving parts will alter the result of the equation F=Ma due to the effect of force resistance. Also, the weight of the shaft of the pendulum may be proportionately small compared to the mass of the weight on the end of the pendulum arm but should not be ignored. Wear on the mechanical components will cause inaccuracies; as will stray lateral forces acting on the pendulum weight.

U.S. Pat. No. 4,430,895 entitled "Piezoresistive Accelerometer" issued Feb. 14, 1984 to R. F. Colton and U.S. Pat. No. 4,622,548 entitled "Solid State Electronic G-Force Indicator" issued Nov. 11, 1986 to J. R. Andres et al disclose acceleration sensing transducers for use in accelerometers that are a substantial improvement over pendulum-type accelerometers. Accelerometers using acceleration sensing transducers are more reliable and have smaller size, smaller mass and greater accuracy.

It is an object of the present invention to implement integrated circuit accelerometers into the field of automotive instrumentation.

It is a further object of the present invention to provide instrumentation that provides the driver of a vehicle an accurate, instantaneous readout of the acceleration or deceleration of the vehicle.

It is a further object of the invention to provide instrumentation for accurately analyzing changes made to a vehicle that may affect its acceleration or deceleration performance.

It is yet a further object of the present invention to apply accelerometer technology to automotive instrumentation that will permit the vehicle operator to monitor the performance of the vehicle braking system and the compression ratio of an engine coupled to a standard transmission engine, both of which have a direct bearing on the rate at which the vehicle decelerates when the brakes are applied or the operator's foot is lifted off the accelerator.

It is further object of the invention to provide a G-meter that may be configured to measure G-force values ranging from as little as plus or minus 0.1 g to as great as plus or minus 500 g's by simply changing the value of the sensitivity on the transducer element and recalibrating the instrument.

It is yet a further object of the invention to include electrical current means for providing an output to a computer system or chart recording device for data analysis.

It is yet a further object of the invention to incorporate in the accelerometer instrumentation a tachometer function.

These and other objects of the invention will be apparent from the following disclosure of a preferred embodiment of the present invention.

SUMMARY OF THE INVENTION

According to the present invention, an automotive straight-line G-Meter (accelerometer device) utilizes the input from a piezoresistive transducer to accurately measure and display both straight line forward and backward as well as lateral or side-to-side acceleration or deceleration of a vehicle. The automotive straight line G-meter includes solid state circuitry which temperature compensates and amplifies the transducer output before coupling to an analog meter that is calibrated to show the gravity effect of acceleration and deceleration of the vehicle.

The G-Meter device further includes circuitry for energizing an automotive tachometer that employs a LED (light emitting diode) bar graph to display the revolutions per minute (RPM) of the vehicle engine.

BRIEF DESCRIPTION OF THE DRAWINGS

The invention is best understood with reference to the drawings, in which.

DESCRIPTION OF THE PREFERRED EMBODIMENT

The automotive straight-line G-meter embodying the present invention measures and displays both the straight-line (forward and backward) acceleration/deceleration of a moving vehicle as well as the lateral (side-to-side) acceleration of the vehicle moving around corners. The units of measurement utilized are earth gravities, otherwise known as "G's." One earth gravity is understood to be the scientific standard of 980.665 centimeters per second/per second of acceleration or deceleration.

Figure 1:
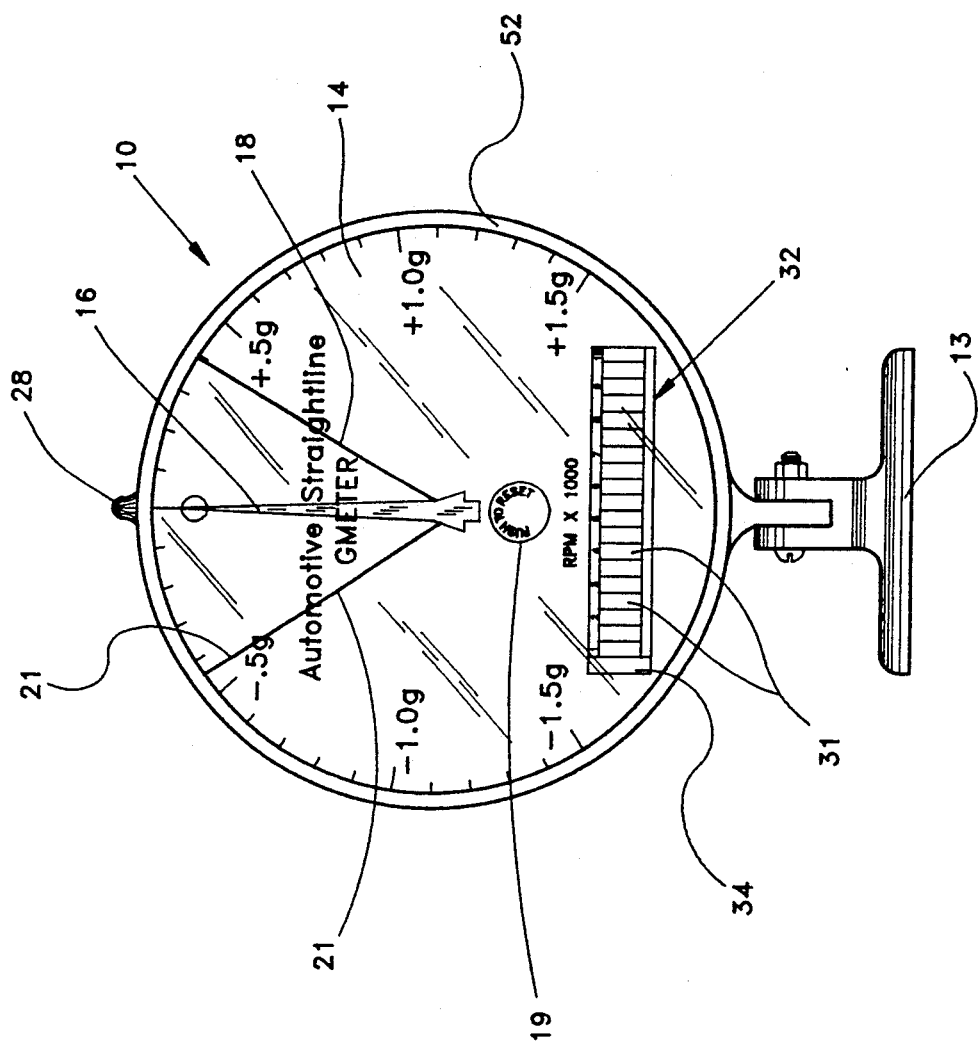
FIG. 1 is a frontal view of a G-Meter according to a preferred embodiment of the invention.
Figure 2:
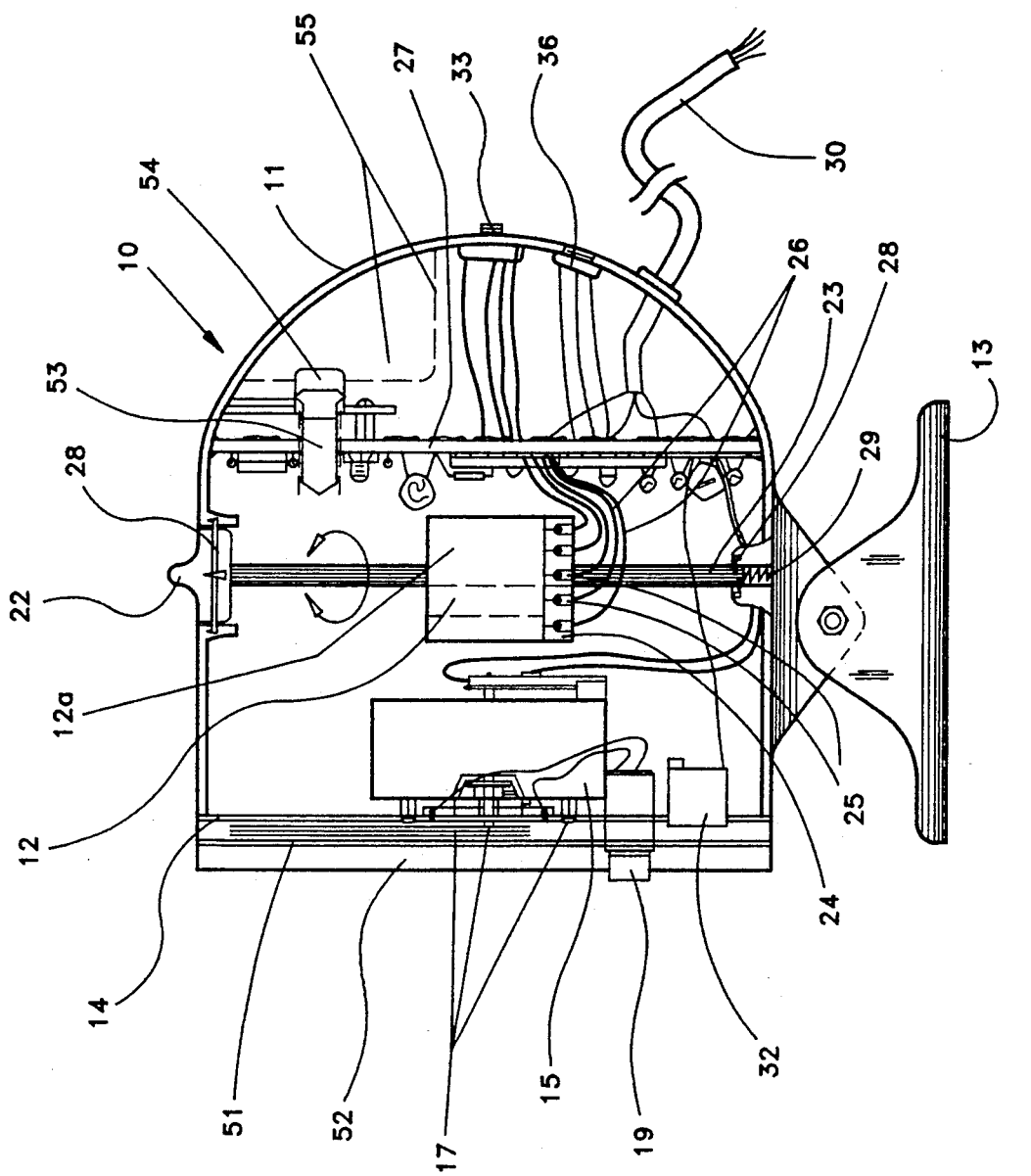
FIG. 2 is a cut-away side elevation illustrating the internal orientation of the components of the G-Meter.

Referring now to FIGS. 1 and 2, the G-Meter, generally designated 10, comprises a cylindrical housing 11 that contains the sensing element 12 and other electronic components to be described. The housing 11 may be dash mounted on its base 13, mounted on a steering column or incorporated into a vehicle instrument panel as standard automotive instrumentation. The acceleration/deceleration data is displayed on the dial face 14 of a 250° analog meter having a moveable coil meter movement 15, see FIG. 2, by moveable pointers of which there are three. When the vehicle is stationary, all three pointers are pointing straight up to the twelve o'clock position. This is the 'zero G' position. When the vehicle is subjected to acceleration, the primary pointer 16 deflects to the right (clockwise as viewed in FIG. 1) an amount directly proportional to the applied acceleration.

As pointer 16 deflects to the right, an electro-mechanical ratchet gear mechanism 17 inside the instrument causes a second pointer 18 to be carried along with the pointer 16. The greater the acceleration factor (G's) the vehicle exerts, the farther the pointers 16 and 18 deflect to the right. In the configuration shown in FIG. 1, the maximum deflection permitted is 125° which would indicate an applied acceleration of +1.5 earth gravities (G's). It is important to note, however, that the G-meter may be configured to measure G-force values ranging from as little as plus or minus 0.1 g to as great as plus or minus 500 g's by simply changing the value or sensitivity of the transducer element 12 and recalibrating the instrument.

As the vehicle rate of acceleration decreases, the primary pointer 16 begins to move counterclockwise or to the left. Pointer 18, however, remains at the highest 'G' level attained until the electro-mechanical ratchet mechanism 17 is reset by the 'push to reset' button 19 on the instrument face. This feature allows the vehicle operator to more easily determine the maximum G's obtained under heavy acceleration, such as in a race.

When the vehicle is subjected to deceleration, such as occurs when the vehicle brakes are applied, the primary pointer 16 deflects counterclockwise to the left an amount directly proportional to the applied deceleration. The electro-mechanical ratchet gear mechanism 17 causes a pointer 21 to simultaneously deflect to the left. The maximum deflection counterclockwise is also 125°; which indicates an applied deceleration of −1.5 earth gravities (−1.5 G's). As the rate of deceleration decreases, the primary pointer 16 moves back to the right. Pointer 21 remains at the maximum deceleration factor attained until reset by the button 19. Once again, this is to allow the operator to more easily determine the maximum deflection attained.

Referring now to FIG. 2, the G-meter instrument housing 11 is shown in a cut-away view to illustrate the orientation of the components. The transducer or acceleration sensing element 12 is shown in dashed outline in a position to sense forward and backward movements of the vehicle and in solid outline in a position to sense lateral sideways movements.

Located on top of the instrument housing 11 is a two position twist-lock mechanism 22. The twist-lock mechanism 22 is coupled to the top of a vertical shaft 23. Within the housing a mounting platform 24 is supported on the shaft 23. The platform has terminals 25 for interconnecting the sensing element to flexible input wires 26 from the accelerometer circuitry on a printed circuit board 27 that receives its input from an interconnection cable 20.

The twist-lock mechanism 22 has a detent plate 28 keyed to the shaft 23 for vertical and rotary movement with the shaft 23 into and out of a selected locked position. This is designed to allow the shaft 23 to be depressed against the bias of a spring 29 in a spring housing 30 at the bottom of the shaft 23, rotated 90 degrees and upon release of the biasing pressure on the shaft 23 to be locked by the detent plate in the rotated position. This allows the vehicle operator to change the mounting axis of the sensing element 12 from a forward and backward orientation to a lateral (side to side) orientation without opening the housing 11 or changing the mounting configuration in the vehicle.

With the sensing element mounted laterally, the vehicle may be monitored, tested or analyzed as to its cornering ability. Right turns are displayed on the right side of the dial scale 14 and left turns on the left side of the dial scale 14. Vehicles may be tested against each other; or various suspension configurations or tires analyzed. When used with auxiliary outputs interfaced with a computer or chart recording device, the automotive straight-line G-meter can provide a printed record of a driver's performance throughout a race. This information can be invaluable to drivers for later analysis.

The ability of the G-meter to accurately measure and display deceleration provides many benefits. For instance: The driver of a vehicle may use the G-meter to analyze or monitor the braking system of a vehicle. Any loss of efficiency in the braking system such as a loss of brake fluid, air in the lines, worn brake pads or tire problems that deteriorate the ability of the vehicle to decelerate can be measured and displayed on the G-meter. This helps to provide the driver an indication of a problem before it becomes critical.

In a vehicle with a standard transmission, the G-meter may also be used to monitor the compression ratio of the engine. To accomplish this the vehicle operator must bring the vehicle to predetermined speed and then remove his foot from the accelerator pedal to allow the vehicle to decelerate solely by the compression of the engine. The negative "G" reading on the G-meter becomes a direct indication of the ability of the engine to decelerate the vehicle. Any significant loss of compression will show a corresponding lower reading on the G-meter below that of a predetermined baseline. Unlike a speedometer, which only displays the speed of the vehicle, the automotive straight-line G-meter allows the operator of a vehicle to quickly and accurately analyze the ability of the vehicle to accelerate. This gives the operator several advantages. For example: In road racing, the driver of a race car can utilize the G-meter to keep his vehicle in its peak acceleration curve. As the race car is accelerated from the starting line, the driver watches the primary pointer 16 of the G-meter. As the vehicle passes through its peak power curve, the primary pointer 16 will reach a certain level and then begin to slowly drift back to the left. This is an indication to the driver that he should shift gears to put the vehicle back into the peak of its acceleration curve. By keeping the primary pointer 16 as far right as possible, the driver is assured he is accelerating at the maximum potential of the vehicle.

Another advantage is that the G-meter may be used to analyze changes made to the vehicle. For example: A significant change in the engine, such as a different camshaft, intake manifold, pistons, etc., will cause corresponding changes in the ability of the vehicle to accelerate. This change can be measured and displayed on the G-meter. Any significant change to a vehicle which affects its ability to accelerate can be measured and displayed on the G-meter. This holds true for many other factors besides the engine. Transmission gearing, differential gearing, weight, aerodynamics and even tires all affect the acceleration characteristics of a vehicle.

As described, the primary functions of the G-meter is to measure and display the G-forces acting on a vehicle during acceleration and deceleration and to provide a data base for a future analysis of the comparative performance of the vehicle.

The G-Meter of the present invention is also capable of performing as a tachometer. Rather than using an analog meter like most tachometers, the automotive straight-line G-meter employs a LED (light emitting diode) bar graph tachometer 32 to display the revolutions per minute (RPM) of a vehicle engine. The bar graph tachometer 32 is designed for use with 4, 6 or eight cylinder four stroke engines; the selection of which is controlled by a cylinder select switch 33. The bar graph preferably consists of 20 separate LED segments 31; each segment representing 500 RPM. It will be understood, however, that the tachometer can be calibrated to other values than 500 RPM per segment. As the engine RPM increases, the segments 31 of the bar graph light up one at a time from left to right. Since each segment 31 represents 500 RPM, the 20 segments give the tachometer a maximum capability of 10,000 RPM.

As an added feature to the tachometer 32, a plastic cover shield 34 is slidably positioned to enable the vehicle operator to cover or shield from view some, all or none of the twenty LED segments 31. Beginning on the left side of the bar graph, the operator can slide the shield 34 to the right to cover any successive number of LED segments 31. This gives the operator a choice of three 'modes' of tachometer operation. The first mode, with the cover shield 34 positioned to the extreme left, gives the operator full view of all 20 LED segments 31, allowing standard use of the tachometer 32 to read engine speed from 500 to 10,000 RPM.

In the second mode, the cover shield 34 is moved to the right to shield any successive number of segments 31 as desired by the operator. This allows use of the tachometer 32 as a "red line" indicator. Example: The maximum safe RPM for a particular vehicle engine is 6,000 RPM and the vehicle operator does not want to exceed this maximum. The operator only has to slide the cover shield to the right to cover the first eleven segments—5,500 RPM—of the bar graph tachometer 32. When the engine reaches 6,000 RPM, the twelfth segment 31 will light up indicating that the engine has reached "red line" and alert the attention of the driver.

The third mode allows the operator to remove the entire bar graph tachometer 32 from view. This is done by simply sliding the cover shield 34 to the extreme right blacking out all twenty LED segments 31 and allowing the operator to concentrate on other things, such as the G-meter pointers 16, 18 and 21.

Figure 3:
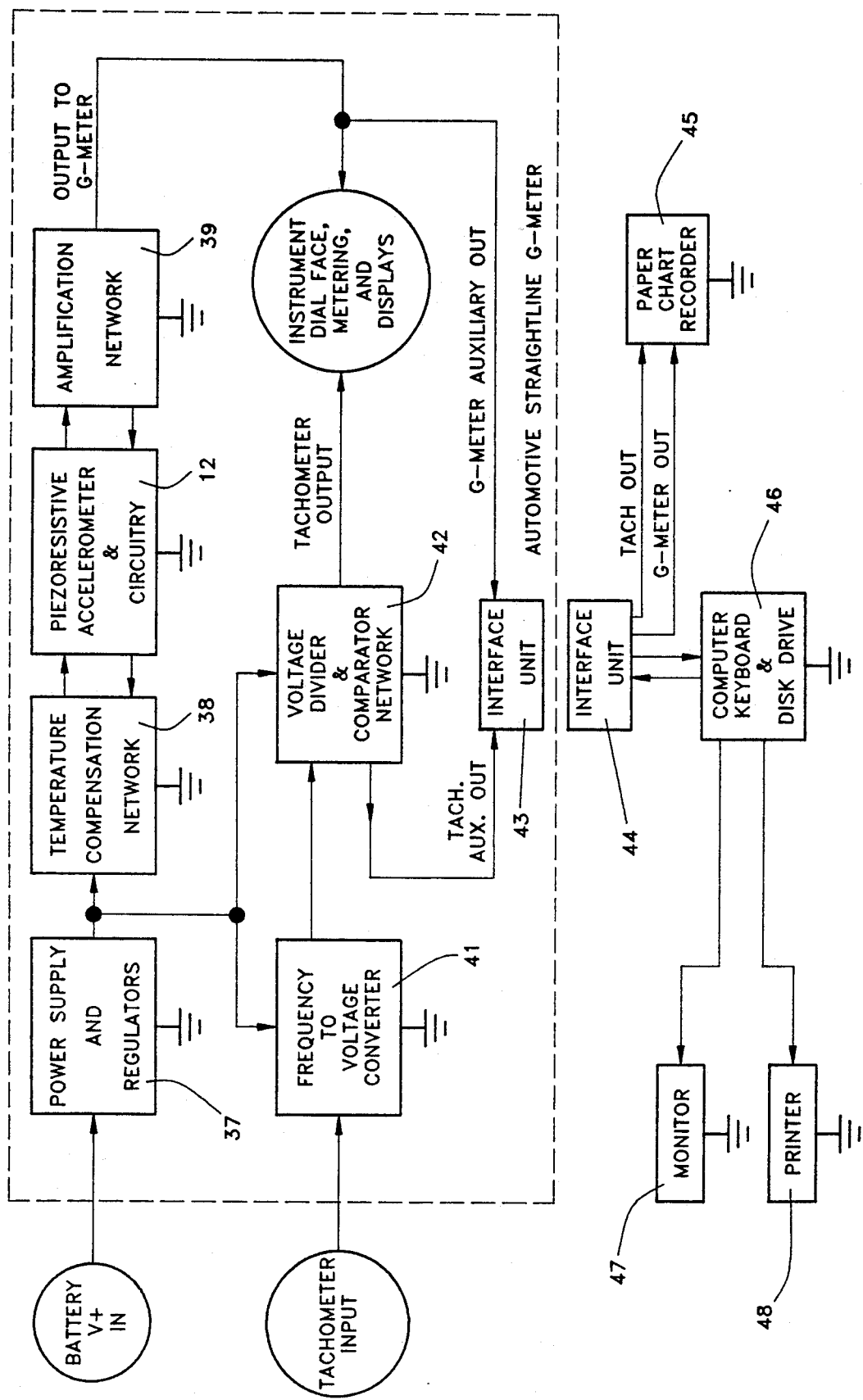
FIG. 3 is a simplified block diagram of the electronic circuitry of the G-Meter.

The electronic circuitry in the G-meter 10/tachometer 32 is illustrated in the FIG. 3 simplified block diagram. It will be understood that all of the electronic components with the exception of the transducer element 12, the LED bar graph 32, the push to reset button 12 and the moving coil meter 15, will be mounted on the printed circuit board 27.

The heart of the automotive straight-line G-force meter is the sensing element 12, preferably a piezoresistive accelerometer such as an ICSensors model 3021, or equivalent, available from ICSENSORS, 1701 McCarthy Blvd., Milipitas, Calif. 95035-7416. The model 3021 is described as a general purpose piezoresistive accelerometer on a ceramic substrate. This accelerometer consists of a micromachined silicon mass suspended from a silicon frame by multiple beams. Piezoresistors located in the beams change their resistance as the motion of the suspended mass changes the strain in the beams. Silicon caps on the top and the bottom of the device are added to provide over range stops and unusually high shock resistance and durability.

Primary power for the automotive straight-line G-meter may be any DC source between 10 and 30 volts. The unit is designed for use in automotive applications where typical battery voltage is 12 VDC. The supply voltage is regulated to 10 volts by voltage regulator 37 see FIG. 3.

The circuitry associated with the accelerator performs primarily two functions: Temperature compensation through a temperature compensation network 38 and amplification through amplification network 39.

A zero calibration adjustment control 36 is accessible at the lower rear surface of the housing (see FIG. 1). Final calibration of the amplifier output is provided by a variable resistor used to set the proper level on the meter. A typical accelerometer has a "zero G" output of 15 to 20 millivolts, and a sensitivity of 8 to 10 millivolts per "G". Since the sensitivity of the accelerometers is fairly linear, the task calibrating the meter is easily accomplished. With the vehicle stationary, the amplifier cell and the meter are calibrated as to provide a "zero G" indication on the dial scale. Any forward (positive) acceleration increases the output of the amplifier cell, thereby causing the meter to deflect to the right (clockwise). Any deceleration of the vehicle decreases the output of the amplifier cell, causing the meter to deflect to the left (counterclockwise).

The tachometer circuitry consists of a frequency to voltage converter 41 set up in standard tachometer configuration to provide a voltage driven output across a variable resistor. The supply voltage to the frequency to voltage converter 41 is a regulated 10 volts DC. The circuit includes a 16 volt protection zener to help protect against spikes. The cylinder select switch 33 (see FIG. 2) connected to appropriate resistors allows use of the tachometer with 4, 6 or 8 cylinder four stroke engines. As the frequency of the tachometer input 32 from the ignition coil of the engine (not shown) increases, the voltage drop over the variable resistor in the frequency to voltage converter circuit 41 increases proportionately. This voltage is fed directly to the negative side of a comparator network 42 that in the disclosed embodiment preferably has a total of 20 independent comparator legs. The reference voltage on the positive input of the comparators is provided by resistors hooked up in series between ground and the regulated 10 volts DC output of the voltage regulator 37. A pair of resistors are used to calibrate the cumulative voltage drop of the entire resistor series.

The values of the resistors hooked up in series between ground and the regulated 10 volt DC output of the voltage regulator are calibrated so as to provide an increasingly higher voltage drop to the positive input each successive comparator. These are the reference voltages for each comparator. The output of the frequency to voltage converter is applied simultaneously to the negative inputs of all 20 comparators. As this voltage rises with engine RPM, the comparators turn on one at a time as the negative input level exceeds the positive input level on each of the comparators. In the configuration shown in FIG. 1, the references voltages are calibrated in such a manner as to make each comparator represent 500 engine RPM. The 20 comparators give the tachometer a maximum capability of 10,000 RPM. As each comparator turns on, it applies a ground to one side of a LED and allows current to flow lighting the LED.

The output of the amplification network is fed to the G-meter and to a G-meter auxiliary output 40 on housing 10 (see FIG. 2). From the auxiliary output 40 there is an input to an interface unit 43 that connects with an interface unit 44 connected to a paper chart recorder 45 and a computer system 46 having a keyboard and disk drive, a monitor 47 and a printer 48 (see FIG. 3). With this assortment of auxiliary equipment, a permanent record can be made of the operation of a vehicle for subsequent analysis.

The front face of the housing 11 is closed by the dial face 14 and a shatterproof glass 51 retained by a screwed on retainer ring 52. At the upper rear portion of the housing 11, a light bulb 53 is mounted in a removable socket 54 accessible in a pocket indentation 55. The light bulb being effective to internally illuminate the dial face of the G-meter.

While the invention has been illustrated with respect to a specific embodiment thereof, this embodiment should be considered illustrative rather than limiting. Various modifications and additions may be made and will be apparent to those skilled in the art. Accordingly, the invention should not be limited by the foregoing description, but rather should be defined only by the claims.

I claim:

1. Electronic instrumentation for indicating transient performance values affecting operation of a motor vehicle during vehicular movement, comprising:

an analog meter calibrated in G-force units having a moving coil meter movement, an electronic G-force sensing transducer for sending electronic signals proportional to G-forces applied on the vehicle in both a positive and a negative force directions, and a bar graph tachometer calibrated in engine revolutions per minutes units;

a printed circuit board providing a plurality of electrical circuit means including:

a first electrical circuit means for causing the moving coil meter movement to remain in a neutral position when no G-forces are applied to the transducer element, a second electrical circuit means for deflecting the moving coil meter movement in a clockwise direction an amount directly proportional to positive G-forces applied to the transducer element and for deflecting the moving coil meter in a counterclockwise direction an amount directly proportional to negative G-forces applied to the transducer element, the second electrical circuit means being connected to the electronic G-force sensing transducer for receiving signals sent therefrom, a third electrical circuit means for compensating for the effect of temperature variances on said transducer element, and a fourth electrical circuit means including a frequency to voltage converter responsive to an input from a vehicle ignition system for sending electronic signals to the bar graph tachometer; and a single instrument housing in which the analog meter, the tachometer, the G-force sensing transducer and the printed circuit board are mounted.

2. Electronic instrumentation according to claim 1, in which:

an electronic circuit means provides an auxiliary output directly proportional to the G-forces applied to the transducer element.

3. Electronic instrumentation according to claim 1, in which:

an electronic circuit means provides an auxiliary output directly proportional to the revolutions per minute of a vehicle engine.

4. Electronic instrumentation according to claim 1, in which:

the analog meter has an indexed and calibrated dial face, and a first pointer is attached to the moving coil meter movement, the pointer being movable over the dial face to indicate the degree of deflection of the moving coil meter movement.

5. Electronic instrumentation according to claim 4, in which:

the dial face calibration extends for 250 degrees with 125 degrees on each side of a zero degree position, wherein when the G-force applied to the transducer element is zero, the first pointer will indicate zero deflection of the moving coil meter movement; when the G-force is a positive force, the signal received through the electrical circuit means from the transducer element will cause deflection of the moving coil meter and the first pointer in a clockwise direction an amount directly proportional to the positive G-force applied to the transducer element; and when the G-force applied to the transducer element is a negative G-force, the deflection of the moving coil meter movement and the first pointer will be in a counterclockwise direction in an amount directly proportional to the negative G-force.

6. In combination, an automotive electronic instrument apparatus contained in a single instrument housing, comprising:

a) an electronic G-force sensing transducer element responsive to G-forces applied in both the positive and the negative force directions, b) a meter having a moving coil meter movement, a first pointer coupled to the moving coil meter movement for indicating the deflection of the moving coil meter movement, a dial face on the meter having an indexed and calibrated scale over which the first pointer is movable to indicate the amount of deflection of said moving coil meter movement from a zero position of the first pointer on the scale, c) electrical circuit means for transmitting increasing or decreasing voltage signals from the G-force sensing transducer element to the moving coil meter movement, and d) an electrical circuit means mounted in the single instrument housing for measuring engine revolutions per minute including a frequency to voltage converter and comparator network responsive to an input from a vehicle ignition system for sending electronic signals to a tachometer mounted in the single instrument housing, wherein the moving coil meter movement will be deflected by increasing voltage from the G-force sensing transducer element in a clockwise direction an amount directly proportional to positive G-forces applied to the transducer element or deflected by decreasing voltage from the G-force sensing transducer element in a counterclockwise direction an amount directly proportional to negative G-forces applied to the G-force sensing transducer element.

7. An improved electronic apparatus for use in an automotive vehicle for measuring G-forces on the vehicle wherein the improvement comprises:

a) a piezoresistive G-force sensing transducer element, b) a G-force indicating moving coil meter movement electronically connected to the G-force sensing transducer element, c) a first electrical circuit means for causing the moving coil meter movement to remain in a neutral position when no G-forces are applied to the transducer element, d) a second electrical circuit means for deflecting the moving coil meter movement in a clockwise direction an amount directly proportional to positive G-forces applied to the transducer element and for deflecting the moving coil meter in a counterclockwise direction an amount directly proportional to negative G-forces applied to the transducer element, the second electrical circuit means being connected to the electronic G-force sensing transducer for receiving signals sent therefrom, e) a third electrical circuit means for compensating for the effect of temperature variances on the G-force sensing transducer element, f) a primary power supply means for regulating electrical input to the first, second and third electronic circuit means, g) means for dividing the output from the power supply to the first, second and third electronic circuit means, h) the G-force indicating moving coil meter movement being responsive to electronic signals received from the first, second and third electronic circuit means, i) a single instrument housing in which are mounted the G-force sensing transducer element, the G-force indicating moving coil meter movement and the first, second and third electrical circuit means, the housing being attached to the automotive vehicle, and j) a fourth electronic circuit means mounted in the single instrument housing including a frequency voltage converter and comparator network responsive to an input from a vehicle ignition system for sending electronic signals to a tachometer mounted in the single instrument housing for measuring revolutions per minute of an engine.

8. An improved electronic apparatus according to claim 7 further including an LED bar graph connected to the fourth electronic circuit means, the LED bar graph being visible to the operator of the automotive vehicle.

9. An improved electronic apparatus according to claim 8 further including:

a vertical shaft means extending from top to bottom of the housing supports the G-force sensing transducer element, and an external mechanical switch means for rotating the shaft means is accessible to change the mounting axis of the transducer element with respect to the housing to permit measurement of the G-forces along a left to right axis with respect to the housing or to a forward and backward movement axis with respect to the housing, without altering the mounting configuration of the housing.

10. An improved electronic apparatus according to claim 7 further including an additional electronic circuit means for interfacing the apparatus to other electronic equipment including computers, computer accessories and chart recording device for analysis of acceleration and deceleration curves.

11. An improved electronic apparatus according to claim 10, in which:

the additional electronic circuit means provides an auxiliary output directly proportional to the G-forces applied to the transducer element.

12. An improved electronic apparatus according to claim 8, in which:

the LED bar graph includes a shutter for shielding all or a part of the bar graph display.

* * * * *